(12) United States Patent
Ryu

(10) Patent No.: US 7,007,056 B2
(45) Date of Patent: Feb. 28, 2006

(54) MEMORY ADDRESS GENERATING APPARATUS AND METHOD

(75) Inventor: Joo-Hyeon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 626 days.

(21) Appl. No.: 10/152,940

(22) Filed: May 22, 2002

(65) Prior Publication Data

US 2002/0178195 A1 Nov. 28, 2002

(30) Foreign Application Priority Data

May 23, 2001 (KR) .............................. 2001-28459

(51) Int. Cl.
*G06F 15/00* (2006.01)
(52) U.S. Cl. .................................................. 708/404
(58) Field of Classification Search ......... 708/400–405
See application file for complete search history.

(56) References Cited

U.S. PATENT DOCUMENTS

| | | | | |
|---|---|---|---|---|
| 3,673,399 | A * | 6/1972 | Hancke et al. ............... | 708/404 |
| 3,803,391 | A * | 4/1974 | Vernet ......................... | 708/404 |
| 3,871,577 | A * | 3/1975 | Avellar et al. ............... | 708/404 |
| 4,787,055 | A * | 11/1988 | Bergeon et al. .............. | 708/405 |
| 4,841,464 | A * | 6/1989 | Guichard et al. ............ | 708/402 |
| 5,339,265 | A * | 8/1994 | Liu et al. ..................... | 708/400 |
| 2005/0010628 | A1 * | 1/2005 | Vinitzky ...................... | 708/404 |

OTHER PUBLICATIONS

Yutai et al., A hardware efficient control of memory addressing for high-performance FFT processors, Mar. 2000, IEEE transactions on signal processing, vol. 48, No. 3, pp. 917-921.*
Johnson, A conflict free memory addressing for dedicated FFT hardware, May 1992, IEEE transactions on circuits and systems-II: analog and digital signal processing, vol. 39, No. 5, pp. 312-316.*
Ayman et al., A modular pipelined implmentation of large Fast Fourier transforms, 2002, IEEE, pp. 995-999.*
Danny, Simplified control of FFT hardware, 1976, IEEE transactions on acoustics, speech, and signal processing, pp. 577-579.*
Yutai, An effective memory addressing scheme for FFT processor, Mar. 1999, IEEE transactions on signal processing, vol. 47, No. 3, pp. 907-911.*

* cited by examiner

*Primary Examiner*—Kakali Chaki
*Assistant Examiner*—Chat C. Do
(74) *Attorney, Agent, or Firm*—Lee, Hong, Degerman, Kang & Schmadeka

(57) ABSTRACT

A memory address generating method in which a memory bank index and an address control signal, that are required for a series of FFT processes in which a plurality of butterfly input samples are concurrently read from the same number of memory banks, a butterfly calculation is performed thereon by using the plurality of butterfly input samples, and the results are concurrently stored at the same position with the input samples, are calculated within a fixed small delay time by using a differential parity counter.

25 Claims, 6 Drawing Sheets

BUTTERFLY $$X_{t1} = X_{s1} + \exp\left[\frac{-j2\pi K}{N}\right] X_{s2}$$

$$X_{t2} = X_{s1} - \exp\left[\frac{-j2\pi K}{N}\right] X_{s2}$$

FIG.8

| ① INITIAL DATA ASSIGNMENT | | | | | | ③ FFT OUTPUT | | | | | |
|---|---|---|---|---|---|---|---|---|---|---|---|
| <d>COUNTER | | | PARITY (PR) | WRITE ADDRESS | | <d>COUNTER | | | PARITY (PR) | WRITE ADDRESS | |
| d2 | d1 | d0 | | BANK | ADDRESS | d2 | d1 | d0 | | BANK | ADDRESS |
| 0 | 0 | 0 | 0 | 0 | 0 | 0 | 0 | 0 | 0 | 0 | 0 |
| 0 | 0 | 1 | 1 | 1 | 0 | 0 | 0 | 1 | 1 | 1 | 0 |
| 0 | 1 | 0 | 1 | 1 | 0 | 0 | 1 | 0 | 1 | 1 | 0 |
| 0 | 1 | 1 | 0 | 0 | 1 | 0 | 1 | 1 | 0 | 0 | 0 |
| 1 | 0 | 0 | 1 | 1 | 0 | 1 | 0 | 0 | 1 | 1 | 1 |
| 1 | 0 | 1 | 0 | 0 | 1 | 1 | 0 | 1 | 0 | 0 | 1 |
| 1 | 1 | 0 | 0 | 0 | 0 | 1 | 1 | 0 | 0 | 0 | 1 |
| 1 | 1 | 1 | 1 | 1 | 1 | 1 | 1 | 1 | 1 | 1 | 1 |

| ② BUTTERFLY OPERATIONS | | | | | | | | | |
|---|---|---|---|---|---|---|---|---|---|
| STAGE | <b>COUNTER | | <p>SHIFT REGISTER | | | <a>VALUE | | READ/WRITE ADDRESS | |
| | b1 | b0 | p2 | p1 | p0 | a1 | a0 | ADDRESS BANK 0 | ADDRESS BANK 1 |
| PASS-0 | 0 | 0 | 0 | 0 | 1 | 0 | 0 | 0 | 0 |
| | 0 | 1 | 0 | 0 | 1 | 0 | 1 | 0 | 1 |
| | 1 | 0 | 0 | 0 | 1 | 1 | 0 | 1 | 0 |
| | 1 | 1 | 0 | 0 | 1 | 1 | 1 | 1 | 1 |
| PASS-1 | 0 | 0 | 0 | 1 | 0 | 0 | 1 | 0 | 1 |
| | 0 | 1 | 0 | 1 | 0 | 0 | 0 | 1 | 0 |
| | 1 | 0 | 0 | 1 | 0 | 1 | 1 | 0 | 1 |
| | 1 | 1 | 0 | 1 | 0 | 1 | 0 | 1 | 0 |
| PASS-2 | 0 | 0 | 1 | 0 | 0 | 1 | 0 | 0 | 0 |
| | 0 | 1 | 1 | 0 | 0 | 1 | 1 | 0 | 1 |
| | 1 | 0 | 1 | 0 | 0 | 0 | 0 | 1 | 0 |
| | 1 | 1 | 1 | 0 | 0 | 0 | 1 | 1 | 0 |

MEMORY ADDRESS GENERATING APPARATUS AND METHOD

BACKGROUND OF THE INVENTION

1. Field of the Invention

The present invention relates to a fast Fourier transform (FFT) system, and more particularly, to an effective memory address generating apparatus and method for implementing a calculation module of a fast Fourier transform (FFT).

2. Description of the Background Art

In general, according to a Fourier theorem that one signal can be expressed as the sum of an infinite number of sinusoidal signals, a signal in the time domain or the frequency domain can be transformed to the corresponding domain through a Fourier transform and an inverse Fourier transform.

A discrete Fourier transform (DFT) transforms a discrete temporal signal expressed as a linear combination of sinusoidal signals having different frequencies into a frequency domain signal of sinusoidal signals and magnitude, which is widely adopted in a digital signal analysis and their fields of application.

A fast Fourier transform (FFT), devised to reduce the complexity of the discrete Fourier transform (DFT), is an algorithm minimizing calculation complexity by using a symmetry characteristic of the discrete Fourier transform when the number of input samples is the square value of '2'. This algorithm is widely used as a practical application of the discrete Fourier transform.

The fast Fourier transform is divided into a decimation in frequency (DIF) algorithm and a decimation in time (DIT) algorithm depending on a derivation method of a formula, and the DIT algorithm, which is widely used, will be mainly described in the present invention.

FIG. 1 is an exemplary view showing the data flow of a so called "bufterfly", the basic computational element of the FFT and a corresponding calculation formula.

As shown in FIG. 1, the calculation result of the butterfly operation is expressed as follows:

$$X_{t1} = X_{s1} + \exp\left(\frac{-j2\pi K}{N}\right) X_{s2}$$

$$X_{t2} = X_{s1} - \exp\left(\frac{-j2\pi K}{N}\right) X_{s2}$$

wherein $X_{s1}$ and $X_{s2}$ are two input data, $X_{t1}$ and $X_{t2}$ are two output data, 'K' is a parameter of the butterfly calculation, and 'N' is the total number of input samples.

FIG. 2 is an exemplary view showing the signal flow of an 8-point FFT using the DIT algorithm.

As shown in FIG. 2, the FFT is formed as the basic calculation unit of a butterfly operation, and each butterfly operation is performed according to a stage.

The FFT calculation method will now be described.

First, time domain input data is stored according to a predetermined order. At this time, the input data storing order is that an input data index is represented as a binary number and the order of the value is reversed, which is called a bit reversed addressing.

Thereafter, the inputted data is processed according to the butterfly calculation determined for each stage like the flow of data as shown in FIG. 2 and an FFT is performed.

At this time, the calculated frequency domain output data of the FFT is stored in ascending order from '0' and outputted, unlike the input data.

However, the FFT method still suffers from many problems with respect to an algorithm operation for implementing faster and more effective hardware in spite of being effective compared to the DFT method.

A method for implementing the FFT algorithm at a high speed will now be taken as an example.

M. C. Pease (M. C. Pease, "Organization of large scale Fourier processors" J. Assoc. Comput. Mach. Vol. 16, pp. 474–482, July 1969) has proposed a memory operating method that concurrently reads and writes a memory for a fast processing speed. This method stores mutually different input/output data of the butterfly calculation operation in different memory banks (a divided memory unit) in order to concurrently read and write them.

FIG. 3 is a signal flow chart showing a memory bank index extraction in the FFT calculation.

As shown in FIG. 3, in this method, orders are given to each line of a signal flow from '0' in turn and data is stored in a memory bank corresponding to the parity of the order value (if the number '1' bits in a binary number is an even number, its parity is '0', while if it is an odd number, its parity is '1').

Accordingly, the whole data are divided and stored in two memory banks, and an input and an output of the butterfly operation are mutually different memory banks over the entire stage.

Meanwhile, D. Cohen (D. Cohen, "simplified control of FFT hardware" IEE Trans. Acoust., Speech Signal Processing, vol. ASSP-24, pp. 577–579, Dec. 1976) and L. G. Johnson (L. G. Johnson, "Conflict free memory addressing for dedicate FFT hardware" IEEE Trans. Circuits Syst. II, vol. 39, pp 312–316, May 1992) have proposed a fast and effective FFT hardware implementing method on the basis of the memory operating method such as in FIG. 3.

However, in case of such method, the index calculation of the memory bank uses the general parity calculation method. Thus, if the size of the FFT is increased, there is a large delay time in calculating a parity, so that this method is not suitable for implementing a fast FFT hardware.

In addition, Y. Ma (Y. Ma, "An effective memory addressing scheme for FFT processors," IEEE Trans. Signal Processing, vol.47, pp. 907–911, March 1999) and L. Wanhammar (Y. Ma and L. Wanhammar, "A Hardware Efficient Control of Memory Addressing for High-Performance FFT processors," IEEE Trans. Signal Processing, vol. 48, No.3, March 2000) have proposed a fast FFT memory operating method in which the calculation of a bank index is fast and simple, instead of using an in-place method (an input and an output of calculation are stored in the same position) such as in the aforementioned method proposed by M. C Peace.

However, this method has problems in that it is difficult to implement an algorithm, a register is additionally required besides a given memory since it does not employ the in-place method, and an FFT structure of a pipeline method is necessarily used, causing a latency time.

SUMMARY OF THE INVENTION

Therefore, an object of the present invention is to provide a memory address generating apparatus and method that are capable of simplifying a calculation process by performing a data input and output by using the same memory bank index and address at each stage of a butterfly calculation.

Another object of the present invention is to provide a memory address generating apparatus and method that are capable of calculating a parity value by using a differential parity counter having a fixed small delay time regardless of the size of the FFT.

Still another object of the present invention is to provide a memory address apparatus and method that are capable of implementing an algorithm with only a minimum memory without using a register, by using an in-place method and which is adaptable to an FFT hardware with a structure which performs a butterfly calculation in a single clock cycle.

To achieve these and other advantages and in accordance with the purpose of the present invention, as embodied and broadly described herein, there is provided a memory address generating apparatus including: a plurality of sample memory bank structures in which an input data and an output data are stored at the same position or read therefrom at each stage of a butterfly calculation; and a memory address generator for calculating a memory bank index and an address within a fixed small delay time in order to generate an address of the sample memory bank.

To achieve the above objects, there is also provided a memory address generating method in which a memory bank index and an address control signal, that are required for a series of FFT calculations in which a plurality of butterfly input samples are concurrently read from the same number of memory banks, a butterfly calculation is performed thereon by using the plurality of butterfly input samples, and the results are concurrently stored in the same position as the input samples, are calculated within a fixed small delay time by using a differential parity counter.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a table related to an operation state obtained by adopting a memory address generation algorithm to the 8-point FFT.

DETAILED DESCRIPTION OF THE PREFERRED EMBODIMENTS

Reference will now be made in detail to the preferred embodiments of the present invention, examples of which are illustrated in the accompanying drawings.

Figure 4:
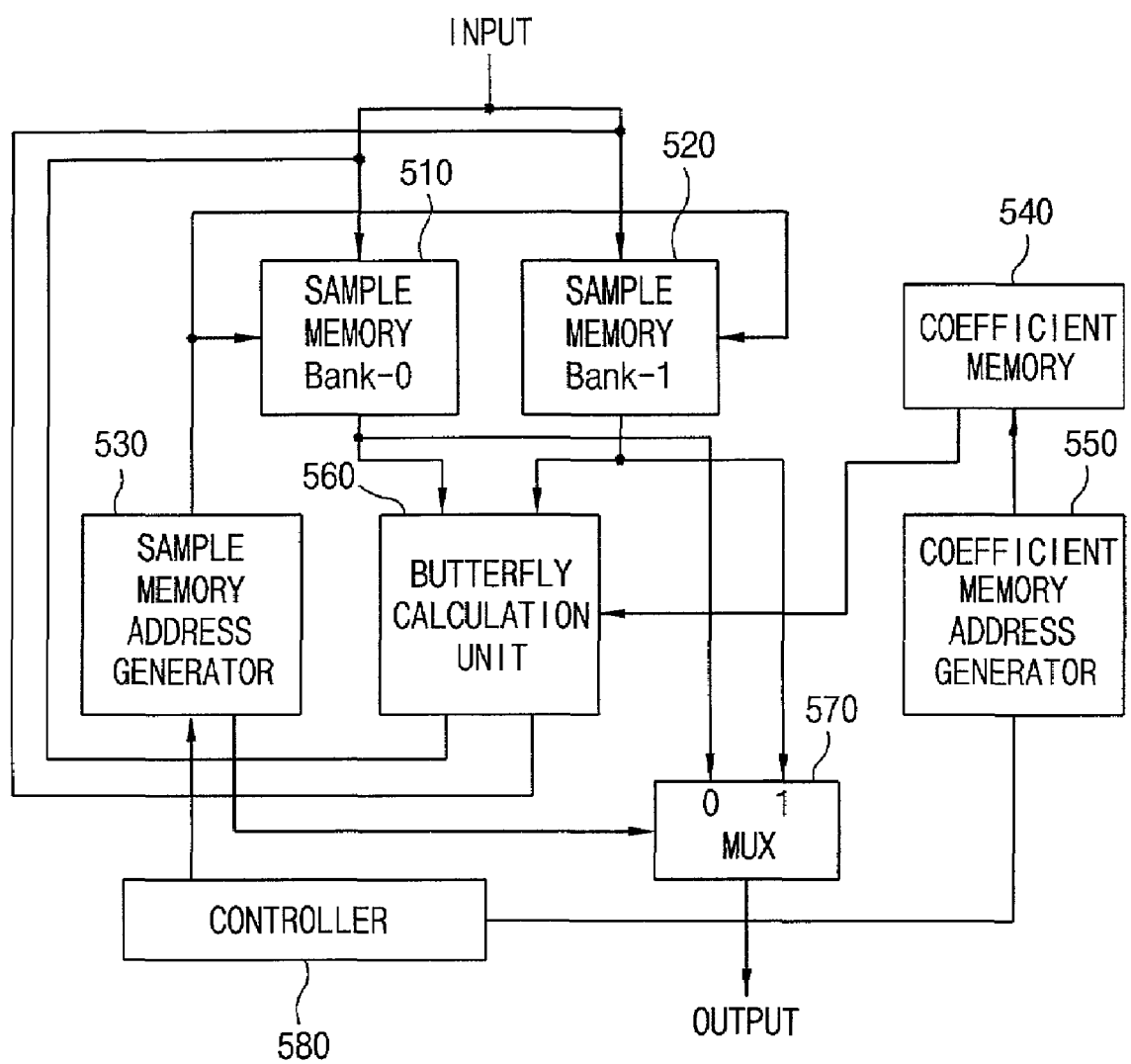
FIG. 4 is a schematic block diagram of a fast Fourier transformer using a memory address generating apparatus in accordance with the present invention.

FIG. 4 is a schematic block diagram of a fast Fourier transformer using a memory address generating apparatus in accordance with the present invention.

As shown in FIG. 4, the fast Fourier Transformer includes: a sample memory bank-0 510 and a sample memory bank-1 520 storing or reading input data and output data of a butterfly calculation operation; a sample memory address generator 530 generating a bank index and addresses of the sample memory bank-0 and -1; a coefficient memory 540 storing twiddle factors, butterfly calculation coefficients; a coefficient memory address generator 550 generating an address of the coefficient memory 540; a butterfly calculation unit 560 receiving data stored in the sample memory bank-0 and the sample memory bank-1 510 and 520 and a coefficient from the coefficient memory 540 to perform a butterfly calculation on them, feeding back the resultant data to the sample memory bank-0 and the sample memory bank-1 510 and 520 storing it therein; a multiplexer 570 receiving data from the sample memory banks 510 and 520 and outputting an FFT result data according to a bank index outputted from the sample memory address generator 530; and a controller 580 controlling the operation of the fast Fourier Transformer.

As for the sample memory banks-0 and -1 510 and 520, there may be provided a plurality of sample memory banks according to the structure of a butterfly operator(currently, the butterfly operator structure uses radix-2 and has two inputs and outputs).

Figure 5:
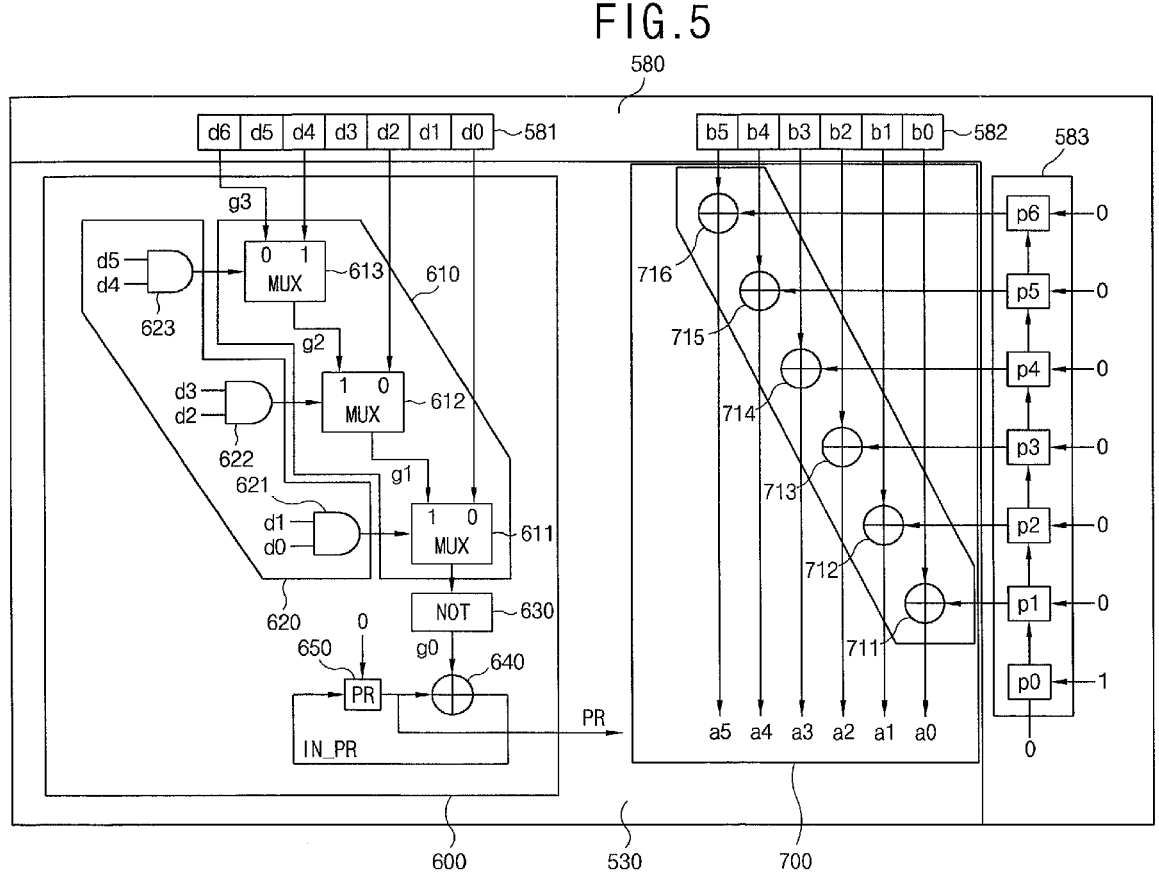
FIG. 5 is a schematic view showing a memory address generator implementing a 128 point FFT in hardware and a partial embodiment of an FFT hardware controller in accordance with the present invention.

FIG. 5 is a view schematically showing a memory address generator for implementing a 128 point FFT in hardware and a partial embodiment of an FFT hardware controller in accordance with the present invention.

As shown in FIG. 5, the controller 580 includes a data counter 581 increasing a data count value (d6~d0) in a positive direction from '0' for every clock cycle; a butterfly counter 582 increasing a butterfly count value (b5~b0) in a positive direction for every clock cycle; and a pass shift register 583 performing a shift operation on a register value (p6~p0) for every stage pass.

The sample memory address generator 530 includes a differential parity counter 600 calculating a parity value, a bank index value, within a fixed small delay time; and a butterfly counter deforming unit 700 outputting a fresh address.

Accordingly, the sample memory address generator 530 adopts the differential parity counter 600 and the butterfly counter deforming unit 700 to the values of the data counter, the butterfly counter and the pass shift register, and outputs a bank index and an address.

The differential parity counter 600 includes a multiplexer unit 610 calculating a parity change value for every clock cycle of the data counter 581; a NOT gate 630 inverting an output signal of the multiplexer unit 610; an AND gate unit 620 calculating the count value (d5~d0) of the data counter 581 and outputting a signal to control the multiplexer unit 610; a flip-flop 650 storing a current parity value (pr); and an XOR gate 640 XORing the current parity value and a parity change value (g0) outputted from the NOT gate to calculate the next parity value (in_pr) and storing the next parity value (in_pr) in the flip-flop 650.

The multiplexer unit 610 includes a multiplexer 611 selecting one of a specific one bit (d0) from the data counter 581 and a parity change value (g1); a multiplexer 612 selecting one of a specific one bit (d2) from the data counter and a parity change value (g2) and outputting it as the parity change value (g1); and a multiplexer 613 selecting one of a specific one bit (d4) from the data counter and a parity change value (g3=d6) and outputting it as the parity change value (g2).

The AND gate unit 620 includes: an AND gate 621 ANDing two specific bits (d0) (d1) from the data counter 581 and outputting the result as a control signal of the multiplexer 611; an AND gate 622 ANDing two specific bits (d2) (d3) from the data counter 581 and outputting the result as a control signal of the multiplexer 612; and an AND gate 623 ANDing two specific bits (d4) (d5) from the data counter 581 and outputting the result as a control signal of the multiplexer 613.

The butterfly counter deforming unit 700 includes XOR gates 711~716 XORing the count values (b5~b0) of the butterfly counter 582 and the pass shift register 583 (p6~p1) and calculating an address (a5~a0).

The memory address generating method of the present invention will now be described.

Figure 6:
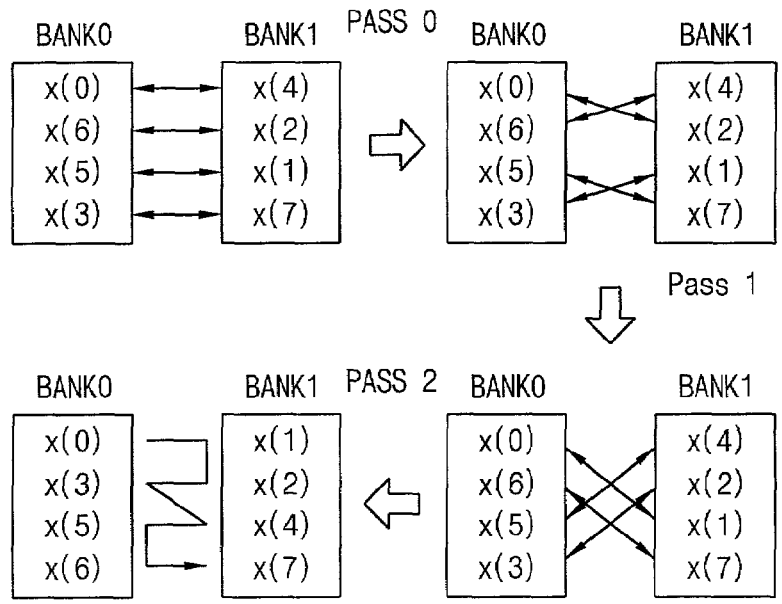
FIG. 6 is an exemplary view showing a state that data are stored in a memory bank according to a stage pass and pairs of butterfly input data.

FIG. 6 is an exemplary view showing a state that data are stored in a memory bank according to the pass stage and pairs of butterfly input data.

Figure 1:
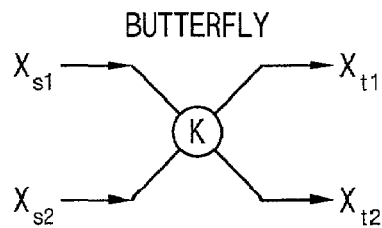
FIG. 1 is an exemplary view showing a data flow of a butterfly calculation operation, a basic calculation unit of a fast FFT and corresponding calculation formulas.
Figure 2:
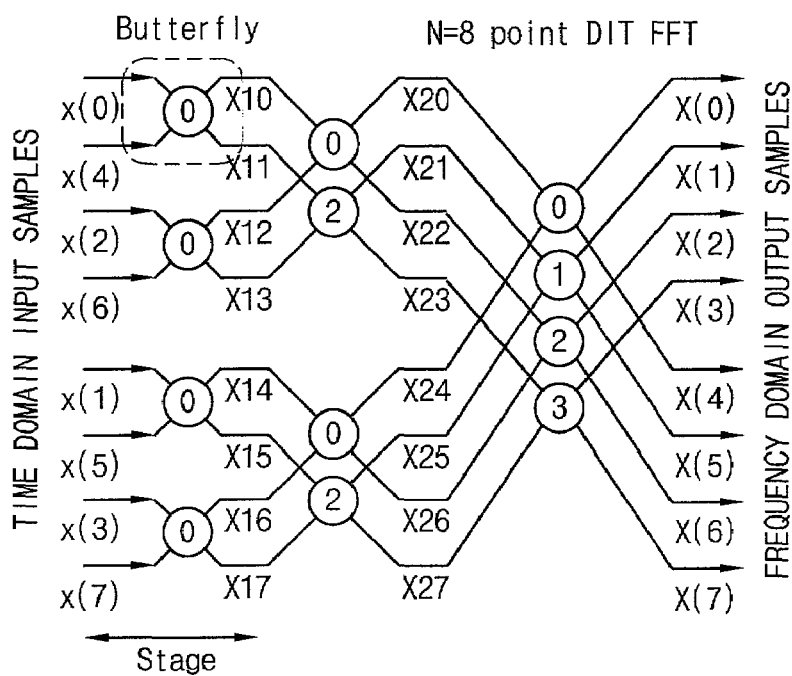
FIG. 2 is an exemplary view showing a signal flow of an 8-point FFT using a decimation in time (DIT) algorithm.
Figure 3:
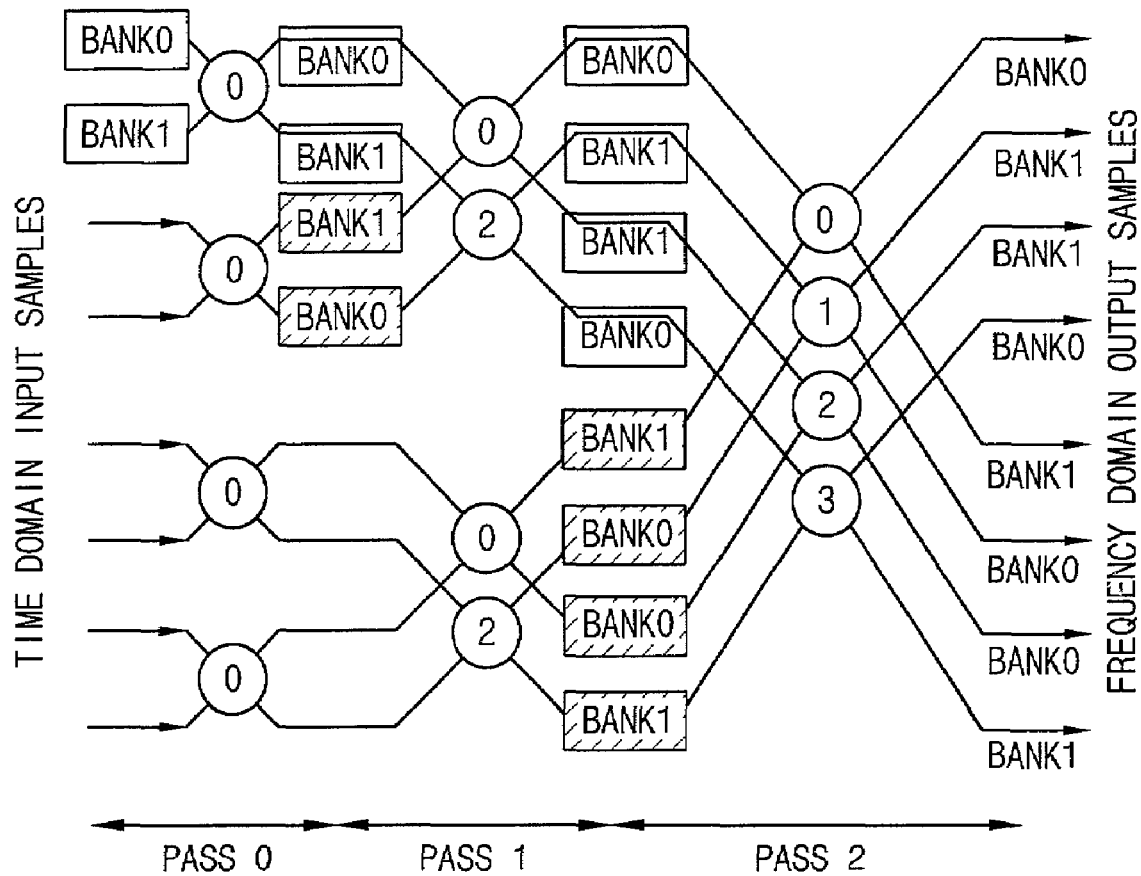
FIG. 3 is a signal flow chart showing a memory bank index extraction in an FFT calculation.

As shown in FIG. 6, the present invention is achieved by adopting the memory allocation algorithm as shown in FIGS. 3 and 6 to the sample memory address generator 530.

That is, a memory bank index and an address control signal, that are required for a series of FFT processes in which butterfly input samples of the sample memory banks-0 and -1 510 and 520 are concurrently read from the memory banks, a butterfly calculation is performed by using the butterfly input samples, and the results are concurrently stored at the same position as the input samples, are calculated within a fixed small delay time by using a differential parity counter.

The memory address generating method of the present invention will now be described in more detail by taking an 8-point FFT of a DIT algorithm as an example.

First, a data input step of the present invention is as follows.

A time domain data, an input value of an FFT, is stored in the sample memory banks 510 and 520 for every clock cycle through an input terminal.

At this time, as the output value of the data counter of the controller 580 is sequentially increased from '0' to '7' for every clock cycle, an address of the sample memory banks 510 and 520 is outputted as an index and an address of the sample memory banks 510 and 520.

For example, on the assumption that a binary representation of the data counter 581 is {d2, d1, d0}, a bank index for storing an initial data is identical to the parity value of the data counter 581, and addresses of a corresponding sample memory bank among the sample memory banks 510 and 520 are {d0, d1}.

This can be generalized and adopted to the N-point FFT as follows.

On the assumption that a binary representation of the data counter is {d(n−1), d(n−2), . . . , d1, d0} when 'n' is defined as a log2(N) value, the bank index is identical to the parity of the data counter 581 and the addresses of the sample memory banks 510 and 520 are {d0, d1, . . . , d(n−3), d(n−2)}.

Thereafter, a butterfly calculation process of the present invention is as follows.

A butterfly calculation is performed on the data stored in the sample memory banks 510 and 520 according to each stage by the butterfly calculation unit.

That is, two data are read from each of the sample memory banks 510 and 520, on which the butterfly calculation is performed together with a twiddle factor, and two result data are respectively stored in the sample memory banks 510 and 520.

At this time, an input address and an output address of the sample memory banks 510 and 520 are the same for one butterfly calculation. And, the pass shift register shifts once at the end of each stage, and the butterfly counter 582 sequentially increases a count value for every butterfly calculation.

For example, on the assumption that a binary representation of the pass shift register 583 is {p2, p1, p0} and a binary representation of the butterfly counter 582 is {b1, b0}, initial values are {0,0,1} and {0,0}, respectively, and the next values are sequentially {0,0,1} and {0,1}, {0,0,1} and {1,0}, {0,0,1} and {1,1}, {0,1,0} and {0,0}, {0,1,0} and {0,1}, {0,1,0} and {1,0}, {0,1,0} and {1,1}, {1,0,0} and {0,0}, {1,0,0} and {0,1}, {1,0,0} and {1,0}, and {1,0,0} and {1,1}.

That is, in performing a butterfly calculation at an arbitrary stage, an input address and an output address of the sample memory bank-0 510 are {b1, b0}, the same with the butterfly counter 582, and input and output addresses of the sample memory bank-1 520 are {a1, a0}, that is, the calculation result of the pass shift register 583 and the butterfly counter 582.

At this time, as the input and output addresses of the sample memory bank-1 520 are calculated in the butterfly counter deforming unit 700, a1 is a value obtained by XORing b1 and p2, and a0 is a value obtained by XORing b0 and p1.

This is generalized as defined above and adopted to the N-point FFT as follows.

On the assumption that a binary representation of the pass shift register 583 is {p(n−1), p(n−2), . . . , p1, p0} and a binary representation of the butterfly counter 582 is {b(n−2), b(n−1), . . . b1, b0}, input and output addresses of the sample memory bank-0 510 are {b(n−2), b(n−1), . . . , b1, b0}, and input and output addresses of the sample memory bank-1 520 are {a(n−2), a(n−1), . . . , a1, a0}.

That is, the input and output addresses a(m) of the sample memory bank-1 520 is a value obtained by XORing b(m) and p(m+1) in the butterfly counter deforming unit 700.

A data output process according to the butterfly calculation is as follows.

A frequency domain data stored in the sample memory bank-0 and -1 510 and 520 according to the butterfly calculation is outputted to the output terminal one by one for every clock cycle through the multiplexer 570.

At this time, as the data counter 581 provided in the controller 580 is sequentially increased for every clock cycle, an address of the sample memory banks 510 and 520 is generated.

For example, on the assumption that a binary representation of the data counter is {d2, d1, d0}, a bank index for data output is the same as the parity value of the data counter 581 and the address of the sample memory banks 510 and 520 is {d2, d1}.

This is generalized as defined above and adopted to the N-point FFT as follows.

On the assumption that a binary representation of the data counter 581 is {b(n−1), b(n−2), ..., b1, b0}, an index of the sample memory banks 510 and 520 is the parity of the data counter 581 and an address of the sample memory banks 510 and 520 is {b(n−1), b(n−2), ... b1}.

Meanwhile, as shown in FIG. 5, an operation for generating an address of the sample memory banks 510 and 520 in the FFT calculation will now be described.

First, in the differential parity counter 600, whenever the data counter 581 is increased in a positive direction from '0' for every clock cycle, the AND gate unit 620 ANDs the value of data counter 581 and outputs a signal to control the multiplexer unit 610.

At this time, the multiplexer unit 610 is controlled according to the output of the AND gate unit 620 and outputs a parity change value. The parity change value is inverted by the NOT gate 630 and outputted to the XOR gate 640.

Thereafter, an output value (g0) of the NOT gate 630 and the current parity value stored in the flip-flop 650 are XORed in the XOR gate 640 and the obtained value is outputted as a parity value (pr). The calculated parity value (in_pr) is stored in the flip-flop 650 again.

Figure 7:
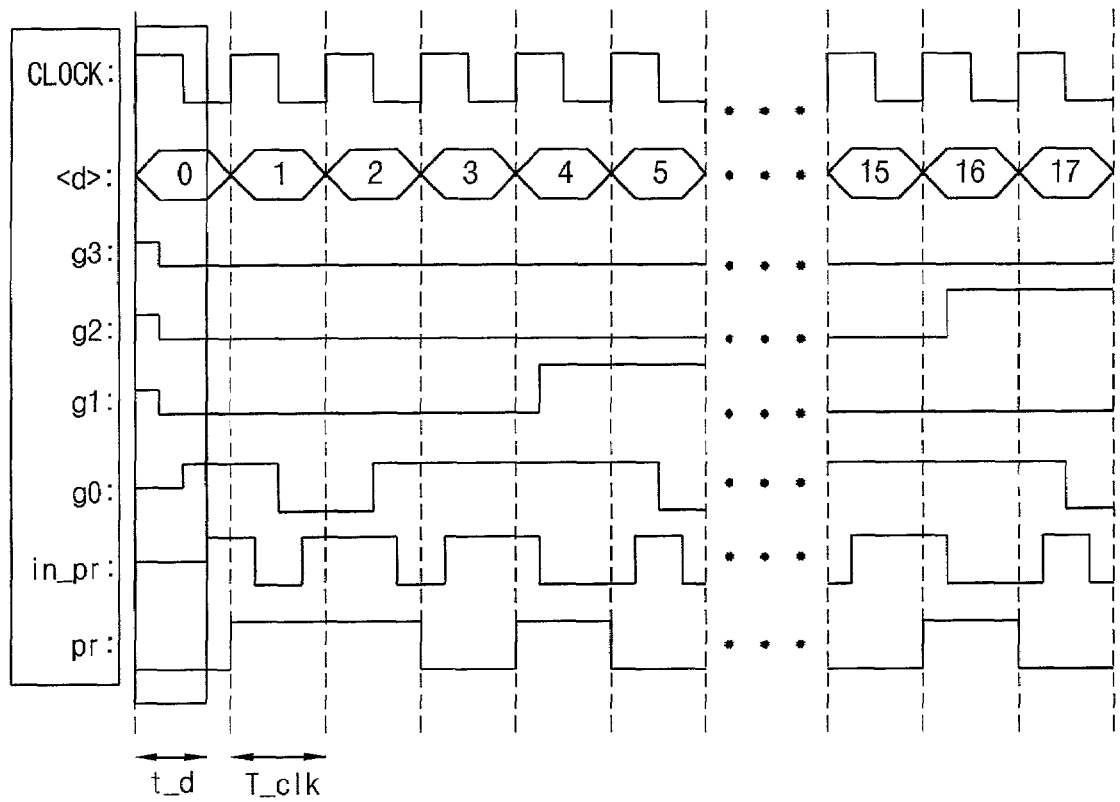
FIG. 7 is a view showing signal timings obtained by adopting an operation of a differential parity counter to an 8-point FFT.

This operation is repeatedly performed as the clock proceeds, of which waveforms for output values of each part are as shown in FIG. 7.

FIG. 7 is a view showing signal timings obtained by adopting an operation of a differential parity counter to an 8-point FFT.

As shown in FIG. 7, the differential parity counter 600 indicates a fixed small delay time (t_d) irrespective of a size of the FFT and since the calculated parity value (pr) is an output value of the flip-flop 650, a control signal can be quickly inputted to the sample memory banks 510 and 520 and the multiplexer 570, making it possible to implement a high speed FFT hardware.

FIG. 8 is a table related to an operation state obtained by adopting a memory address generation algorithm to the 8-point FFT.

As shown in FIG. 8, the memory address generating method can implement a high speed FFT hardware by adopting a parity value generated by a differential parity counter algorithm to the memory address generating algorithm.

As so far described, the memory address generating apparatus and method of the present invention have many advantages.

That is, for example, first, the memory address allocation method is improved so that a high speed FFT hardware irrespective of the size of the FFT can be implemented while concurrently reading and writing an input and output data of a butterfly.

Secondly, since a circuit having a fixed small delay time irrespective of the FFT size is used for a parity calculation required for the memory bank, the slow parity calculation problem according to the method proposed by D. Cohen and L. G. Johnson is solved.

Thirdly, the memory bank of the input and output data and the address value are identical to each other, and a circuit for calculating the value can be simply implemented.

Thirdly, since the present invention employs the in-place method, a use of memory is minimized in implementing an FFT hardware, Fourthly, the algorithm of the present invention can be also adopted to an FFT hardware with a structure performing a butterfly calculation in a single clock cycle, not a pipeline structure.

Lastly, besides the DIT method as described above, the present invention can be also adopted to the DIF method and an FFT having various radix values.

Thus, the memory address generating apparatus and method of the present invention can be adopted to an orthogonal frequency division multiplexing (OFDM) modulation method in a high speed digital communication sector, a frequency domain equalizer (FDE), and a frequency domain echo canceller so as to realize a high speed operation at the same cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A memory address generating method comprising: a plurality of butterfly input samples are concurrently read from the same corresponding number of sample memory banks, a butterfly calculation is performed by using the plurality of butterfly input samples, and a memory bank index and an address control signal required for a series of Fast Fourier Transform (FFT) processes for storing the results at the same position as that of the input samples, are calculated within a fixed small delay time by using a differential parity counter, wherein the differential parity counter comprises: a multiplexer unit for calculating a parity change value for every clock cycle of a data counter; a NOT gate for inverting an output signal of the multiplexer unit; an AND gate unit for calculating a count of the data counter and outputting a signal to control the multiplexer unit; a flip-flop for storing a current parity value (pr); and an XOR gate for XORing the current parity value and a parity chance value (q0) outputted from the NOT gate to calculate the next parity value (in_pr), and storing the next parity value (in_pr) in the flip-flop.

2. The method of claim 1, wherein the memory bank index is the same as a parity value of a data counter, and an address of the sample memory bank is calculated by a data count value.

3. The method of claim 1, wherein, in the butterfly calculation, a plurality of input values are simultaneously received from each sample memory bank and calculated, and a resultant data is simultaneously stored in the sample memory bank in the same corresponding position.

4. The method of claim 3, wherein the butterfly calculation is performed upon an input value from the sample memory bank and a coefficient.

5. The method of claim 1, wherein a butterfly counter deforming unit calculates an address corresponding to each memory bank, such that each memory bank has the same sample memory bank index and address when a data is inputted or outputted at each stage.

6. The method of claim 1, wherein the differential parity counter selects one of each specific bit of the data counter and the parity change value to output it as the parity change value, inverts a final output signal of the parity change value, XORs the inverted parity change value and the current parity value stored in the flip-flop and stores the resultant value as the next parity value in the flip-flop, thereby having a fixed small delay time irrespective of a size of a Fast Fourier Transform (FFT).

7. The method of claim 5, wherein the butterfly counter deforming unit XORs a value of the butterfly counter and a shift value of a pass shift register, to calculate an address.

8. The method of claim 1, wherein a plurality of sample memory bank exist to concurrently read and write a plurality of input or output data, and generate a parity of a small delay time fixed by a data counter value for every clock.

9. A memory address generating method comprising: a data input step for receiving a time domain data for every clock cycle and concurrently storing it in a sample memory bank-0 and a sample memory bank-1; a butterfly calculation step for reading two time domain data from the sample memory bank-0 and the sample memory bank-1 and performing a butterfly calculation thereon according to each stage together with a twiddle factor, and concurrently storing frequency domain data in each sample memory bank as two resultant data; a data output step for receiving the two frequency domain data and outputting it to an output terminal one by one for every clock cycle through a multiplexer; and generating a memory address of the sample memory bank using a differential parity counter for calculating a parity as a bank index of the sample memory, wherein the differential parity counter comprises: a multiplexer unit for calculating a parity change value for every clock cycle of a data counter; a NOT gate for inverting an output signal of the multiplexer unit; an AND gate unit for calculating a count of the data counter and outputting a signal to control the multiplexer unit; a flip-flop for storing a current parity value (pr); and an XOR gate for XORing the current parity value and a parity chance value (q0) outputted from the NOT gate to calculate the next parity value (in_pr), and storing the next parity value (in_pr) in the flip-flop.

10. The method of claim 9, wherein, in the butterfly calculation step, the input address and the output address of the sample memory bank for the butterfly calculation are the same with each other, a pass shift register shifts once for each stage, and the butterfly counter sequentially increases a count value for every butterfly calculation.

11. The method of claim 9, wherein, in the butterfly calculation step, input and output addresses of the sample memory bank-0 are the same with the butterfly counter at an arbitrary stage, and input and output addresses of the sample memory bank-1 are an XOR calculation result of a pass shift register and the butterfly counter.

12. The method of claim 9, wherein, in the data input and output step, the bank index of the outputted data is the same with the parity value of the data counter, and the address of the sample memory bank is obtained from a data count value.

13. A sample memory address generating apparatus comprising: a sample memory bank-0 and a sample memory bank-1 in which input and output data at each stage of a butterfly calculation are stored at the same position or read therefrom; a sample memory address generator for generating a memory address of the sample memory bank, wherein the memory address generator comprises a differential parity counter comprising: a multiplexer unit for calculating a parity change value for every clock cycle of a data counter; a NOT gate for inverting an output signal of the multiplexer unit; an AND gate unit for calculating a count of the data counter and outputting a signal to control the multiplexer unit; a flip-flop for storing a current parity value (pr); and an XOR gate for XORing the current parity value and a parity chance value (q0) outputted from the NOT gate to calculate the next parity value (in_pr), and storing the next parity value (in_pr) in the flip-flop.

14. The apparatus of claim 13, further comprising:
a coefficient memory for storing a twiddle factor, coefficient of the butterfly calculation;
a coefficient memory address generator for generating an address of the coefficient memory;
a butterfly calculator for receiving the data from the sample memory bank and the coefficient from the coefficient memory, and performing a butterfly calculation on them;
a multiplexer for receiving the data outputted from the sample memory bank and a bank index from the memory address generator, and outputting an FFT calculation result; and
a controller for outputting a counter value to control an operation of the apparatus.

15. The apparatus of claim 13, wherein the memory address generator further comprises:
a butterfly counter deforming unit for calculating an address of the sample memory bank.

16. A memory address generating apparatus comprising: a sample memory bank-0 and a sample memory bank-1 for concurrently storing or reading an input data and an output data of a butterfly calculation operation, a sample memory address generator for generating a parity and an address of the sample memory bank and outputting them; a butterfly calculator for concurrently reading input data of the sample memory bank, performing a butterfly calculation on them, and outputting and storing the calculation result in the sample memory bank; and a multiplexer for receiving the data outputted from the sample memory bank and a bank index from the sample memory address generator, and outputting a Fast Fourier Transform (FFT) calculation result; wherein the memory address generator comprises a differential parity counter for calculation a parity as a bank index having a fixed small delay time and a butterfly counter deforming unit for calculating an address, so as to have the same memory bank index and address in inputting and outputting data at each stage: wherein the differential parity counter comprises: a multiplexer unit for calculating a parity change value for every clock cycle of a data counter; a NOT gate for inverting an output signal of the multiplexer unit; an AND gate unit for calculating a count of the data counter and outputting a signal to control the multiplexer unit; a flip-flop for storing a current parity value (pr); and an XOR gate for XORing the current parity value and a parity chance value (q0) outputted from the NOT gate to calculate the next parity value (in_pr), and storing the next parity value (in_pr) in the flip-flop.

17. The apparatus of claim 16, further comprising:
a controller for generating a counter value to control an operation of the apparatus in a fast Fourier transforming operation.

18. The apparatus of claim 17, wherein the controller comprises:
a data counter for increasing a data count (d6~d0) in a positive direction from '0' for every clock cycle;
a butterfly counter for increasing a butterfly count (b5~b0) in a positive direction for every clock cycle; and
a pass shift register (p6~p0) for performing a shift operation for every pass stage.

19. The apparatus of claim 16, further comprising:
a coefficient memory for storing a twiddle factor, butterfly calculation coefficient; and a coefficient memory address generator for generating an address of the coefficient memory.

20. The apparatus of claim 19, wherein, in the butterfly calculation, input data are read from each sample memory bank to perform a calculation together with the twiddle factor, and the data are stored in the sample memory banks.

21. The apparatus of claim 16, wherein the multiplexer unit comprises:
   a multiplexer for selecting one of a specific one bit (d0) of the data counter and a parity change value (g1);
   a multiplexer for selecting one of a specific one bit (d2) of the data counter and a parity change value (g2) and outputting it as the parity change value (g1); and
   a multiplexer for selecting one of a specific bit (d4) of the data counter and a parity change value (g3=d6) and outputting it as the parity change value (g2).

22. The apparatus of claim 16, wherein the AND gate unit comprises:
   an AND gate for ANDing two specific bits (d0) (d1) of the data counter and outputting its result as a first control signal of the multiplexer unit;
   an AND gate for ANDing two specific bits (d2) (d3) of the data counter and outputting its result as a selected control signal of the multiplexer unit; and
   an AND gate for ANDing two specific bits (d4) (d5) of the data counter and outputting its result as a third control signal of the multiplexer unit.

23. The apparatus of claim 16, wherein the butterfly counter deforming unit is constructed as an XOR gate for XORing a value of the butterfly counter and a shift value of the shift register to calculate an address.

24. The apparatus of claim 16, wherein the butterfly counter deforming unit shifts a pass shift register for every pass stage.

25. The apparatus of claim 16, wherein the sample memory bank includes a plurality of sample memory banks for concurrently reading and writing a plurality of input and output data.

* * * * *